US009430503B1

(12) United States Patent
Delgado et al.

(10) Patent No.: US 9,430,503 B1
(45) Date of Patent: Aug. 30, 2016

(54) COALESCING TRANSACTIONAL SAME-BLOCK WRITES FOR VIRTUAL BLOCK MAPS

(71) Applicant: EMC Corporation, Hopkinton, MA (US)

(72) Inventors: Diane M. Delgado, Carlisle, MA (US); Lawrence Yetto, Mt. Vernon, NH (US); Alexei Karaban, Southborough, MA (US); William C. Davenport, Burlington, MA (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 405 days.

(21) Appl. No.: 13/929,999

(22) Filed: Jun. 28, 2013

(51) Int. Cl.
*G06F 17/30* (2006.01)

(52) U.S. Cl.
CPC .................. *G06F 17/30289* (2013.01)

(58) Field of Classification Search
CPC .................. G06F 17/30327; G06F 17/30495; G06F 17/30289
USPC ........................................................ 707/703
See application file for complete search history.

(56) References Cited

U.S. PATENT DOCUMENTS

| 7,689,599 | B1 | 3/2010 | Shah et al. | |
|---|---|---|---|---|
| 7,797,483 | B1* | 9/2010 | Suryanarayanan | G06F 11/1458 711/100 |
| 8,190,850 | B1* | 5/2012 | Davenport et al. | 711/202 |
| 8,495,338 | B2 | 7/2013 | Jeddeloh | |
| 8,898,204 | B1* | 11/2014 | Sathe et al. | 707/812 |
| 2011/0131387 | A1* | 6/2011 | Bacik | 711/171 |
| 2014/0019405 | A1 | 1/2014 | Borthakur et al. | |
| 2014/0089565 | A1* | 3/2014 | Lee et al. | 711/103 |

* cited by examiner

*Primary Examiner* — James Trujillo
*Assistant Examiner* — Jessica N Le
(74) *Attorney, Agent, or Firm* — BainwoodHuang (57) ABSTRACT

A technique for preserving metadata changes in a transaction log involves coalescing metadata changes based on the block of storage in which the metadata to be changed resides. Metadata change information that accompanies a file system command is stored in nodes of a searchable data structure, wherein each node accumulates metadata changes for a respective block of storage. Once all metadata changes are specified in the searchable data structure, or after some threshold number of metadata changes have been stored, the storage processor composes a transaction for each node summarizing the metadata changes and writes the transaction to the transaction log.

21 Claims, 5 Drawing Sheets

COALESCING TRANSACTIONAL SAME-BLOCK WRITES FOR VIRTUAL BLOCK MAPS

BACKGROUND

Storage systems typically arrange not only data, but also metadata, into blocks of storage. For example, a file in a file system has an inode stored in a block of storage of a storage system that points to other blocks of the storage system in which data belonging to the file reside.

Such storage systems may use a transaction log to record changes to metadata. A transaction log is a log stored in non-volatile memory (e.g., on disk) which is used to preserve and protect metadata changes, thus preventing associated data from being corrupted. For example, a command from a file system, such as to create a file, is accompanied by a sequence of metadata changes. Suppose that, in the midst of executing the file system command, there is a system panic and the storage system shuts down, having processed only a fraction of the metadata changes accompanying the file system command. In this case, without a record of the metadata changes that were supposed to have been implemented, the storage system is left with potentially inconsistent metadata, which may lead to corruption of corresponding data. By recording the metadata changes in a transaction log, however, the storage system can go back to the transaction log to recover the metadata changes that were not implemented prior to the shutdown and implement them.

When the storage system identifies a set of individual metadata change instructions accompanying a file system command, a conventional approach to populating the transaction log has the storage system expressing each metadata change instruction in terms of a standard syntax that identifies a piece of metadata and the state of that piece of metadata after the change instruction.

SUMMARY

Unfortunately, there are deficiencies with the above-described conventional approach to populating the transaction log. For example, in such an approach, the transaction log provides a different transaction for each metadata change. When the transaction log is played back and each metadata change in the transaction log is implemented, the storage system performs multiple processing operations (e.g., cyclic redundancy check, fetch block, modify block, store block, etc.) for each metadata change. When multiple metadata changes affect the same block of underlying storage, these processing operations are invoked once for each metadata change, even though such operations repeatedly access and process the same block. Such preprocessing operations are processor and memory-intensive. Also, providing a different transaction for each metadata change consumes valuable space in the transaction log, which may be of limited size.

In contrast with the conventional approach to populating the transaction log, an improved technique involves coalescing metadata changes based on the block of storage in which the metadata to be changed resides. Metadata change information that accompanies a file system command is stored in nodes of a searchable data structure, wherein each node accumulates metadata changes for a respective block of storage. In an example, each node of the searchable data structure contains one or more bitmaps, each of which representing a type of transaction to be carried out on metadata. For example, four bitmaps may be provided, including a "to be allocated" bitmap, a "to be committed" bitmap, a "to be modified" bitmap, and a "to be freed" bitmap. Upon receipt of a file system command, the storage processor converts each specified metadata change into a bit value at a position within one of the bitmaps indicative of a position of the metadata to be changed within the block. Once all metadata changes are specified in the searchable data structure, or after some threshold number of transactions have been stored, the storage processor composes a transaction for each node (i.e., each block) summarizing the values of the bitmaps and writes the transaction to the transaction log. The multiple accumulated metadata changes for any given block, as represented by the bitmaps, may then be processed together.

Advantageously, the improved technique provides for efficient processing of same-block transactions because the storage processor need only invoke expensive block-based operations, such as cyclic redundancy check, fetch block, modify block, and store block, once for each entire set of same-block metadata changes, rather than once for each individual metadata change. Further, by coalescing these same-block metadata changes in respective transactions, the transaction log is made to include fewer transactions for any given file system command and thus is less likely to run out of space. Further, coalescing the same-block metadata changes is also a more efficient use of logging space which allows for more log traffic; this results in the system being able to handle a greater load.

One embodiment of the improved technique is directed to a method of preserving metadata changes in a transaction log. The method includes identifying, by the storage processor, a set of metadata change instructions that accompany the file system operation on the file in response to a request to perform a file system operation on a file stored in the storage device. The method also includes arranging metadata change information specified in the set of metadata change instructions among multiple nodes of a searchable data structure, each of the multiple nodes accumulating metadata change information to be recorded in a respective block of storage in the storage device, such that each node of the searchable data structure accumulates metadata change information for a different block of the storage device. The method further includes, for each node of the set of nodes, writing the accumulated metadata change information to the transaction log.

Additionally, some embodiments of the improved technique are directed to a storage system constructed and arranged to record metadata change instructions in a transaction log. The storage system includes a network interface, memory, and a controller including controlling circuitry constructed and arranged to carry out the method of recording metadata change instructions in a transaction log.

Furthermore, some embodiments of the improved technique are directed to a computer program product having a non-transitory computer readable storage medium which stores code including a set of instructions which, when executed by a computer, cause the computer to carry out the method of recording metadata change instructions in a transaction log.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves coalescing metadata changes based on the block of storage in which the metadata to be changed resides.

Figure 1:
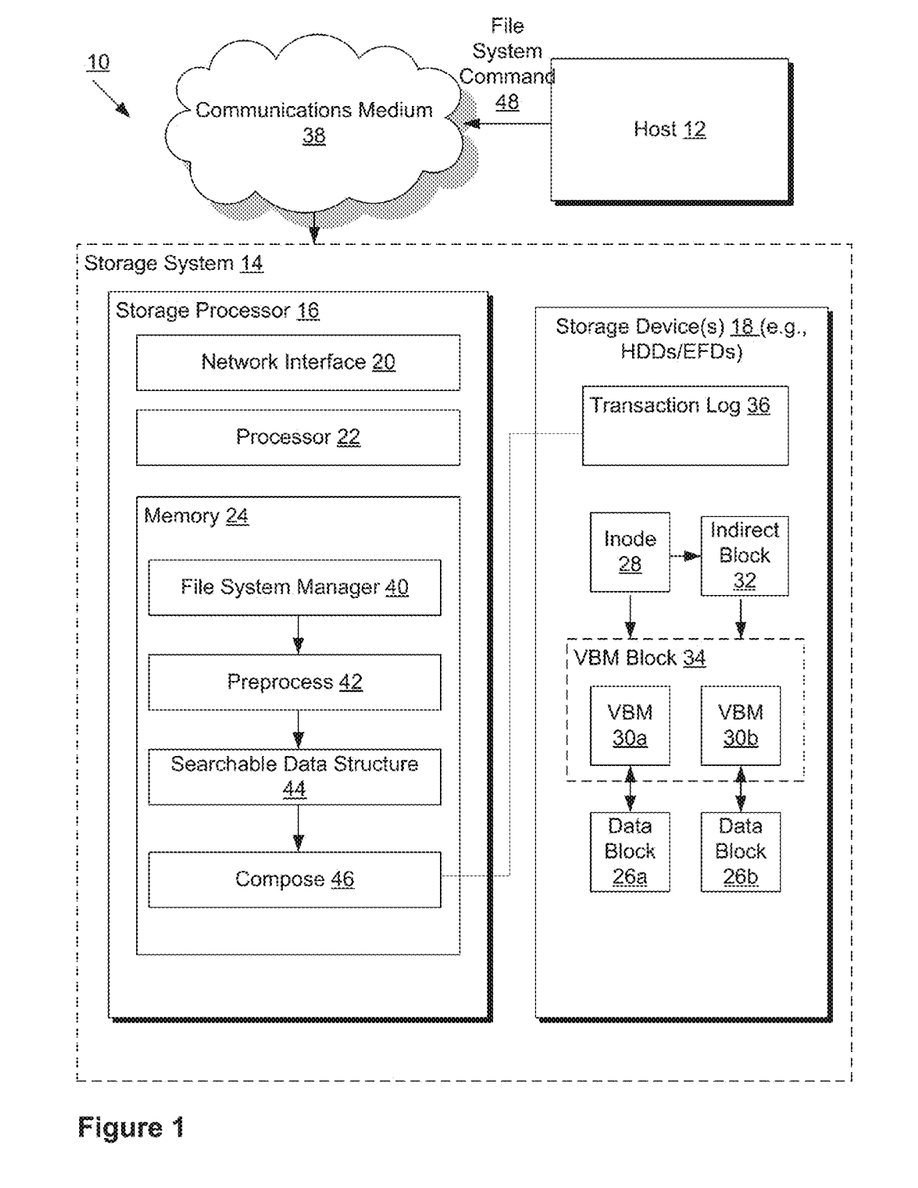
FIG. 1 is a block diagram illustrating an example electronic environment in which the improved technique may be carried out.

FIG. 1 illustrates an example electronic environment 10 in which the improved technique can be carried out. Electronic environment 10 includes host 12, communications medium 38, and storage system 14, which in turn includes storage processor 16 and storage device 18. Storage device 18 is provided, for example, in the form of hard disk drives, solid state drives (SSDs) and/or electronic flash drives (EFDs). Although not shown in FIG. 1, storage system 14 may include multiple storage processors like storage processor 16. For instance, multiple storage processors may be provided as circuit board assemblies, or "blades," which plug into a chassis that encloses and cools the storage processors. The chassis has a backplane for interconnecting the storage processors, and additional connections may be made among storage processors using cables. It is understood, however, that no particular hardware configuration is required, as any number of storage processors (including a single one) can be provided and storage processor 16 can be any type of computing device.

Communications medium 38 can be any type of network or combination of networks, such as a storage area network (SAN), local area network (LAN), wide area network (WAN), the Internet, and/or some other type of network, for example. In an example, host 12 connects to storage processor 16 using various technologies. For example, host 12 can connect to the storage processor 16 using NFS (e.g., through a SAN). Host 12 can connect to the storage processor 16 using TCP/IP, to support, for example, iSCSI, NFS, SMB 3.0, and CIFS. Any number of hosts (not pictured) may be provided, using any of the above protocols, some subset thereof, or other protocols besides those shown. As is known, NFS, SMB 3.0, and CIFS are file-based protocols. Storage processor 16 is configured to receive requests such as file system command 48 according to file-based protocols and to respond to such requests by reading or writing storage device 18.

Host 12 may be configured to send requests such as a file system command 48 to storage processor 16 via communications medium 38. In some arrangements, host 12 is a desktop computer; in other arrangements, host 12 can be a server, a laptop computer, a tablet computer, or any other electronic device having a processor capable of issuing requests.

Storage processor 16 is seen to include a network interface 20, a processor 22, and memory 24. Network interface 20 includes, for example, network interface adapters, for converting electronic and/or optical signals received from the communications medium 38 to electronic form for use by storage processor 16. Processor 22 includes one or more processing chips and/or assemblies. In a particular example, the processor 22 includes numerous multi-core CPUs. Memory 24 includes both volatile memory (e.g., RAM), and non-volatile memory, such as one or more ROMs, disk drives, solid state drives (SSDs), and the like. Processor 22 and memory 24 together form control circuitry, which is constructed and arranged to carry out various methods and functions as described herein. Also, memory 24 includes a variety of software constructs realized in the form of executable instructions. When the executable instructions are run by processor 22, processor 22 is caused to carry out the operations of the software constructs. Although certain software constructs are specifically shown and described, it is understood that memory 24 typically includes many other software constructs, which are not shown, such as an operating system, various applications, processes, and daemons.

As shown, memory 24 includes a file system 40, a preprocess module 42, a searchable data structure 44, and a compose module 46.

File system manager 40 is configured to organize data in the form of accessible blocks, such as data blocks 26a and 26b in storage device 18. Metadata, such as inode 28 and indirect block 32, may include pointers that point to the blocks 26a and 26b, respectively. In some arrangements, file system manager 40 makes use of virtual block maps (VBMs) 30a and 30b, which are stored in VBM block 34.

VBMs are metadata that provide intermediate structures disposed between an inode or indirect block for a file and the actual data blocks storing the file's contents. An inode (or indirect block) points to a VBM, which in turn points to another VBM or to a data block. Each data block accessed by a VBM generally includes a pointer back to the VBM that points to it, such that each data block points to a single VBM. VBMs may be used advantageously in systems that support de-duplication. In an example, each VBM block (e.g., 26a, 26b) stores many VBMs. In a particular example, each VBM block stores 102 VBMs.

Preprocess module 42 is configured to cause processor 22 to deconstruct file system command 48 into a set of metadata change instructions. For example, preprocess module 42 contains software configured to identify metadata change instructions that accompany file system command 48. Such metadata change instructions specify file system metadata "to be modified," "to be freed," "to be allocated," and/or "to be committed." Each metadata change instruction includes a reference to a block of metadata in which metadata affected by a transaction are located. Following the example, a typical transaction may take the form "Modify VBM 29 2507," which refers to a "to be modified" change to be carried out on the $29^{th}$ VBM entry in VBM block number 2507.

Searchable data structure 44 is configured to store transactions organized by metadata block number in searchable nodes. For example, the metadata change instruction "Modify VBM 29 2507" would be arranged in a node assigned to all metadata change instructions affecting metadata block number 2507. In some arrangements, storage processor 16 expresses each such metadata change instruction in the form of a bit (or set of bits) within one or more of the bitmaps in the respective node.

Compose module 46 is configured to cause processor 22 to compose transactions accumulated in nodes of searchable data structure 44. The compose module 46 may operate after all metadata change instructions that accompany the file system command 48 have been recorded in the bitmaps of the searchable data structure 44. Alternatively, processor 22 determines whether there are at least a threshold number of metadata instructions entered in the searchable data structure 44. Compose module 46 then composes transactions from the accumulated metadata change instructions in a form that is compatible with transaction log 36. The processor 22 may then write the composed transactions to the transaction log 36.

During example operation, host 12 issues file system command 48 to storage processor 16 in connection with data (e.g., a file or directory) belonging to a user. For example, when the file system command 48 reflects an application on host 12 writing new data to a file, storage processor 16 assigns new data blocks for the new data and allocates new VBMs for each new data block. If the application erases some data in the file, storage processor 16 may free some data blocks and free the VBMs belonging to those data blocks.

Storage processor 16 then identifies metadata change instructions accompanying the file system command 48. The storage processor 16 identifies metadata blocks in which metadata are being affected, as well as the operations affecting that metadata, and updates the searchable data structure 44 to reflect all changes made for each block. In an example, each update of the searchable data structure 44 may be accompanied by a lookup, which determines whether the block on which a metadata change instruction is being performed is already represented in the searchable data structure 44 or whether a new node needs to be added.

Figure 2:
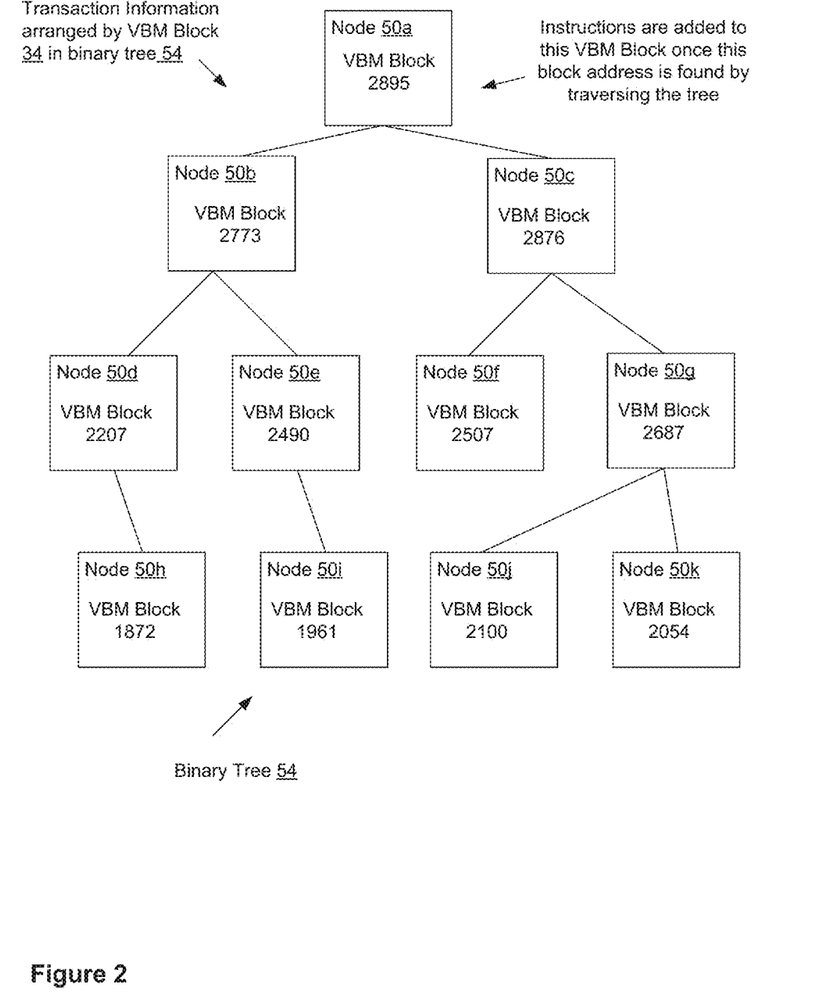
FIG. 2 is a block diagram illustrating an example searchable data structure configured to accumulate metadata change information within the electronic environment shown in FIG. 1.

FIG. 2 illustrates a binary tree 54 as a special case of searchable data structure 44 in which transactions are arranged in nodes 50*a-k* (nodes 50) of binary tree 54. Each node 50 contains transactions corresponding to a VBM block that contains VBM pointers, each of which in turn point to a data block in storage. For example, node 50*a* contains transactions affecting VBM pointers in VBM block 2895, while node 50*b* contains transactions affecting VBM pointers in VBM block 2876.

In performing the lookup on a VBM block number, storage processor 16 traverses binary tree 54 until either storage processor 16 finds a match between the VBM block number of a node in binary tree. The tree is ordered so the search may be halted when storage processor 16 finds a node in the tree greater than a node that is sought if searching in ascending order. If searching in descending order then the search may be halted when storage processor 16 finds a node in the tree less than a node that is sought. In either case, storage processor 16 performs a traversal of binary tree 54 as part of the lookup. It should be understood that an advantage of using a tree such as binary tree 54 is that the traversal may be accomplished on average in $O(\log_2 N)$ operations rather than $O(N)$ operations with a linear data structure, where N is the number of nodes.

In the former case in which storage processor 16 finds a match at, say, node 50*b*—i.e., an instruction was received for VBM block 2773—storage processor 16 updates node 50*b* by recording the instruction in that node. In the case in which storage processor 16 traverses the entirety of binary tree 54 without finding a match, storage processor 16 creates a new node, say node 50*h* corresponding to VBM block number 1872, in binary tree 54. It should be understood that such a node is a child node to a node of binary tree 54. The new node is inserted in the tree in an ordered fashion and if needed the tree is then rebalanced. Once the new node has been created, storage processor then updates this new node by recording the transaction in that node.

It should be understood that, by writing the metadata changes to separate nodes of binary tree 54 rather than writing a different transaction to transaction log 36 for each metadata change, storage processor 54 is able to carry out all transactions by metadata block as a group. As discussed above, an advantage of carrying out transactions by block as a group is that expensive operations that are typically carried out on a block in order to support a transaction carried out on metadata in that block (e.g., cyclic redundancy check, fetch block, modify block, store block, etc.) need only be carried out once per group of metadata changes, rather than once per metadata change. For groups containing hundreds of small-block transactions—one VBM block contains 102 VBM entries—the processing savings are potentially enormous.

It should also be understood that further savings still may be realized in how the metadata changes are written into nodes 50 of binary tree 54. There are inefficiencies in the storage of metadata changes in a transaction log. Each transaction log has a fixed size (say, 16 KB) and is thus capable of storing as many metadata changes as that fixed size allows. However, in the case of VBMs, the metadata changes do not have much variety and can be classified in terms of a small number of similar transactions, e.g., to be allocated, to be committed, to be modified, and to be freed. In such a case, the transaction log contains much repetitive information that may be eliminated and hence allow for more transactions to be stored. Further details of how such repetition may be exploited are discussed in connection with FIG. 3.

Figure 3:
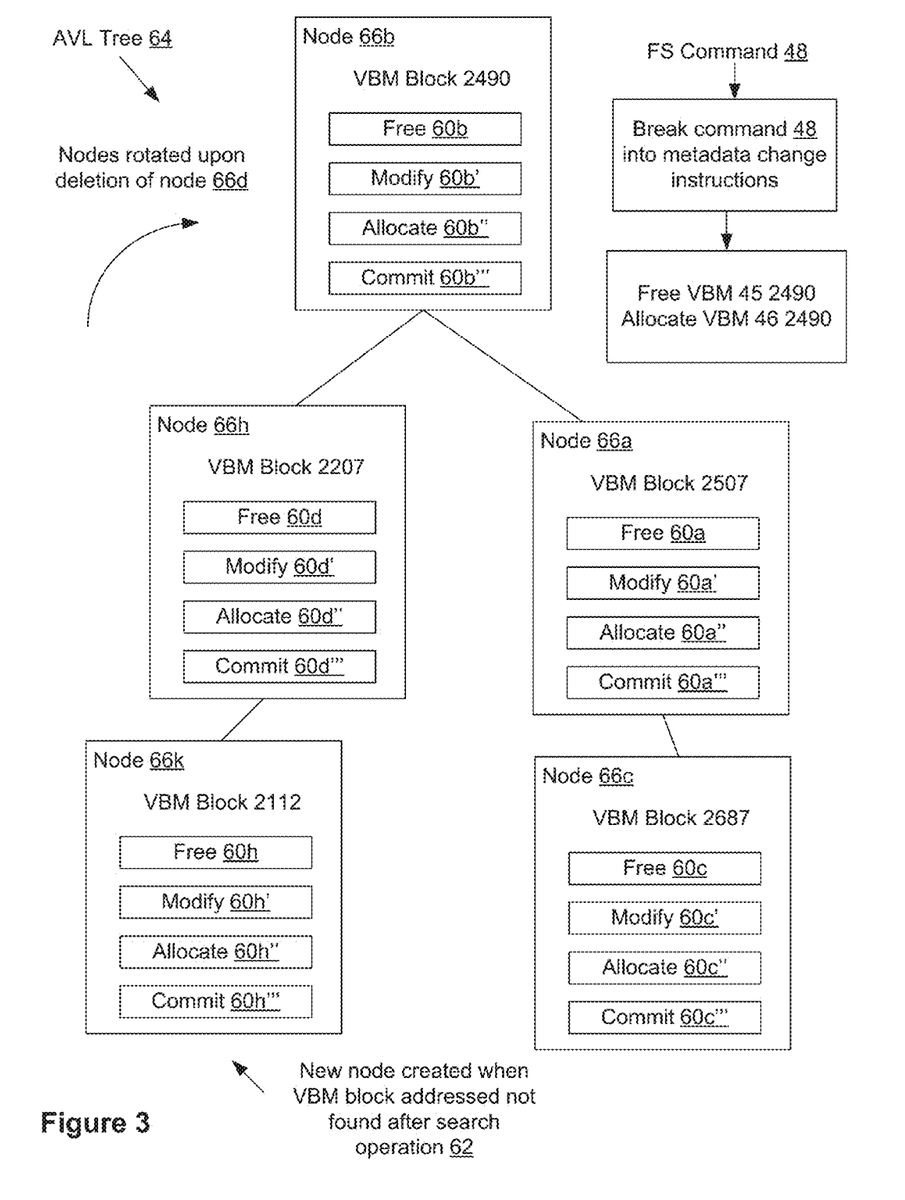
FIG. 3 is a block diagram illustrating another example searchable data structure configured to accumulate metadata change information within the electronic environment shown in FIG. 1.

FIG. 3 illustrates a special case of a binary tree—an Adelson-Velskii and Landis (AVL) tree 64—into which storage processor 16 writes transactions. AVL tree 64 includes a set of nodes 66*a*, 66*b*, 66*c*, 66*d*, and 66*h*, each of which corresponds to a VBM block number. AVL trees are known in the art as special cases of binary trees that have self-balancing properties, although the ordering remains the same as in the more general binary tree described above. Such self-balancing properties advantageously have a worst-case traversal that uses $O(\log_2 N)$ operations, where N is the number of nodes.

Suppose that storage processor 16 performs a preprocessing of file system command 48 as described above, and a result is two metadata change instructions: a Free VBM instruction on the 45$^{th}$ entry of VBM block 2490, and an Allocate VBM instruction on the 46$^{th}$ entry of VBM block 2490. Suppose further that VBM block 2490 does not initially belong to a node 66 of AVL tree 64. Then, as previously described, storage processor adds a new node, 66*h*, as a child to a node, say node 66*d* and rebalanced if necessary, although the rebalancing is automatic in an AVL tree.

Suppose still further that storage processor 16 deletes a node, say, node 66*d*, because storage processor 16 has moved the transaction information in this node to transaction log 36 because, e.g., all of the metadata changes for the block represented by node 66*d* are to be recorded in transaction log 36. Such a deletion and removal of this node from AVL tree 64 will result in an imbalance in AVL tree 64. Nevertheless, because AVL tree 64 is a self-balancing tree, storage processor rotates nodes 66 so as to ensure that that AVL tree 64 is balanced in that the difference in height between new node 50*h* and a leaf node of the opposite side of AVL tree 64, say node 50*c*, is at most one level.

Further, it should be understood that, by recognizing that metadata changes on VBM pointers are one of four actions, storage processor 16 may represent each metadata change as a bit in a bitmap rather than as text or some less compact format. As illustrated in FIG. 3, each node has four bitmaps 60, 60', 60", and 60''' (bitmaps 60) corresponding to a Free VBM, a Modify VBM, a Allocate VBM, and a Commit VBM transaction, respectively. Within each bitmap 60 is a set of bits all set to "0" by default (do not carry out the transaction on the VBM pointer in a particular entry within the VBM block). When storage processor has identified a metadata change instruction from file system command 48, however, it merely needs to set a particular bit in a bitmap to "1". For example, to record the transaction "Free VBM 45 2490," storage processor 16 sets the bit in the 45$^{th}$ place in the Free bitmap 60h to "1". Further, to record the transaction "Allocate VBM 46 2490," storage processor 16 sets the bit in the 45$^{th}$ place in the Allocate bitmap 60h" to "1".

Returning to FIG. 1, storage processor 16 performs a compose operation 46 on the bitmaps in AVL tree 64. In some arrangements, storage processor 16 continuously monitors nodes 60 of AVL tree 64 to determine when a node needs to be flushed and its transactions transferred to transaction log 36. For example, storage processor 16 may compare the number of blocks remaining in a node to a threshold number of transactions and begin to prepare the bitmaps of that node for transfer to transaction log 36 when the number of blocksexceeds the threshold. Details of this transfer are discussed below in connection with FIG. 4.

Figure 4:
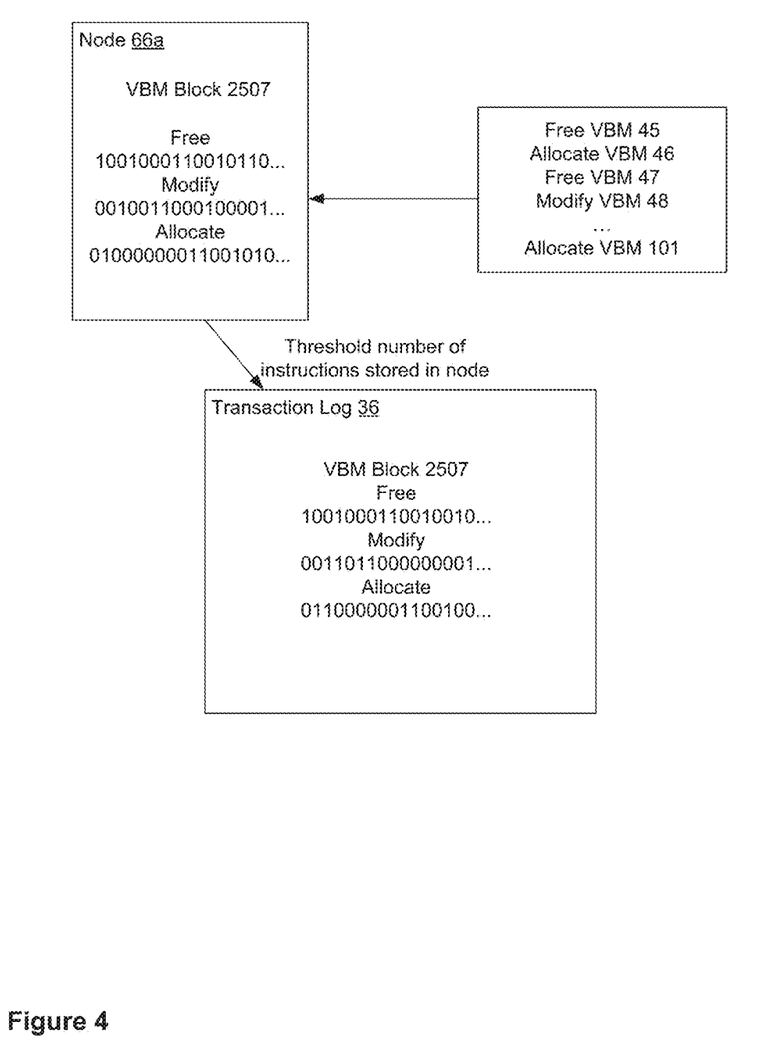
FIG. 4 is a chart illustrating an example transaction log within the electronic system shown in FIG. 1.

FIG. 4 illustrates details of a transfer of bitmaps representing transactions for a VBM block to transaction log 36. As discussed above, a set of metadata change information pertaining to VBM pointers in VBM block 2507 are written in bitmaps in node 66a in AVL tree 64 (see FIG. 3). In the example shown in FIG. 4, several entries of VBM block 2507 are to have Free, Modify, and/or Allocate bits indicated. In this way, the storage processor 16 populates the bitmaps 60a, 60a', and 60a" for a block at the appropriate locations to denote the changes that are to take place on particular VBM pointers within the block. These operations are normally repeated for each block represented in the AVL tree 64.

In the example illustrated in FIG. 4, storage processor 16 is configured to process the transactions from AVL tree 64 only once for each block. In this case, storage processor 16 need only fetch a block, modify a block, store a block, and perform a cyclic redundancy check once per block, rather than once per metadata change. It should be understood that there is typically only one occupied bit position (i.e., having a '1') per node. In some arrangements, however, the Commit VBM bitmap is a subset of the Allocate VBM bitmap; in this case, there may be overlapped occupied bit positions.

Figure 5:
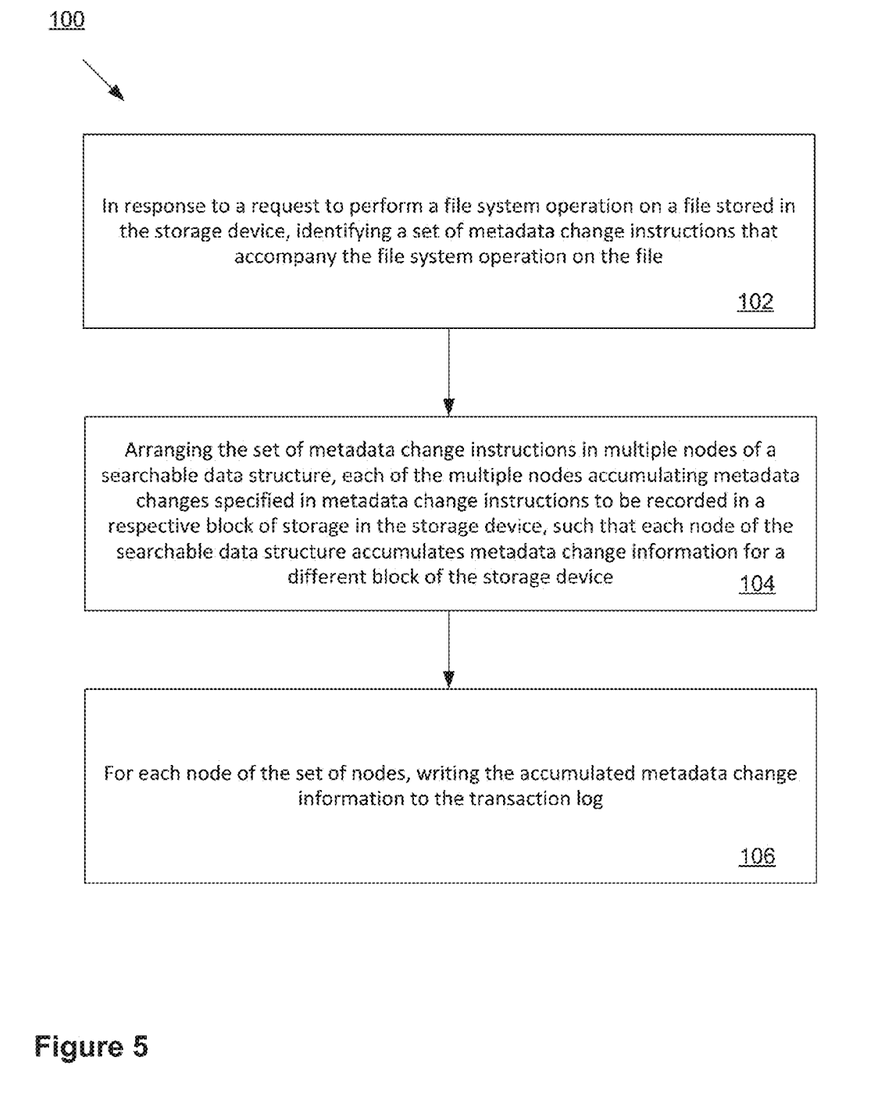
FIG. 5 is a flow chart illustrating an example method of carrying out the improved technique within the electronic environment shown in FIG. 1.

FIG. 5 shows an example method 100 for recording metadata change instructions in a transaction log. The method 100 may be carried out in connection with the storage system 14. The method 100 is typically performed by the software constructs, described in connection with FIG. 1, which reside in memory 24 of storage processor 16 and are run by processor 22. The various acts of the method 100 may be ordered in any suitable way. Accordingly, embodiments may be constructed in which acts are performed in orders different from those illustrated, which may include performing some acts simultaneously, even though the acts are shown as sequential in the illustrated embodiments.

At step 102, a set of metadata change instructions that accompany a file system operation on a file stored in a storage device of a storage system are identified in response to a request to perform a file system operation on the file. For example, metadata change instructions are identified in FIG. 3 as being Free and Allocate operations on VBM pointers in a particular VBM block.

At step 104, the set of metadata change instructions are arranged in multiple nodes of a searchable data structure, each of the multiple nodes accumulating metadata changes specified in metadata change instructions to be recorded in a respective block of storage in the storage device, such that each node of the searchable data structure accumulates metadata change information for a different block of the storage device. Such metadata change information is illustrated, for example, in FIG. 3 as a bitmap 60 within a node of AVL tree 64.

At step 106, for each node of the set of nodes, the accumulated metadata change information is written to the transaction log. For example, FIG. 4 illustrates a bitmap 60 being written to transaction log 36.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, while the examples described here referred mainly to VBMs, the improved technique may also apply to other metadata.

Further, while the improved techniques described heretofore have been described as applied to file systems, the improved techniques may also be applied other types of structures. Examples of other structures include LUNs, vVols, VMDKs, VHDs, and so forth. In such cases, the structures being accessed may be represented as files in one or more internal file systems of the data storage apparatus. File system requests as described above may be generated internally.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. In a storage system including a storage device and a storage processor, a method of preserving metadata changes in a transaction log, the method comprising:
in response to a request to perform a file system operation on a file stored in the storage device, identifying, by the storage processor, a set of metadata change instructions that accompany the file system operation on the file;
arranging metadata change information specified in the set of metadata change instructions among multiple nodes of a searchable data structure, each of the multiple nodes accumulating metadata change information to be recorded in a respective block of storage in the storage device, such that each node of the searchable data structure accumulates metadata change information for a different block of the storage device; and
for each node of the set of nodes, writing the accumulated metadata change information to the transaction log,
wherein each respective block of storage in which metadata change information is to be recorded stores multiple elements of metadata, such that each node of the searchable data structure corresponds to a respective block of storage and to respective metadata elements,
wherein, when arranging the metadata change information, accumulating metadata change information to be recorded in a respective block of storage includes accumulating changes in greater than one of the metadata elements stored in that block of storage, and
wherein accumulating the metadata change information in each node of the searchable data structure includes accumulating elements of metadata in respective bits of a bitmap, the bitmap providing a respective bit for each of the elements of metadata.

2. A method as in claim 1,
wherein the storage device stores multiple virtual block map (VBM) blocks, each VBM block including multiple VBM entries, each VBM entry including a VBM pointer pointing to a block of the storage device;
wherein each of the set of metadata change instructions includes a block identifier identifying a VBM block in the storage device; and
wherein arranging the set of metadata change instructions in multiple nodes of the searchable data structure includes reading, from each of the set of metadata change instructions, the block identifier identifying the respective VBM block.

3. A method as in claim 2,
wherein the searchable data structure is a binary tree; and
wherein arranging the set of metadata change instructions in multiple nodes of the searchable data structure further includes:
for each of the metadata change instructions, traversing at least a portion of the binary tree to determine whether the block identifier of the VBM block specified in the metadata change instruction is already represented in a node of the binary tree,
for each metadata change instruction for which the block identifier is already represented in a node the binary tree, updating the respective node of the binary tree to reflect the metadata change instruction, and
for each metadata change instruction for which the block identifier is not already represented in a node of the binary tree, generating a new node in the binary tree and updating the new node of the binary tree to reflect the metadata change instruction.

4. A method as in claim 3,
wherein the binary tree is an Adelson-Velskii and Landis (AVL) tree; and
wherein the method further comprises:
after deleting a node of the AVL tree, when leaf nodes of the AVL tree have a difference in height of more than one level, rotating the nodes of the AVL tree so that the leaf nodes have at most one hierarchal level difference in height.

5. A method as in claim 2, further comprising:
prior to writing the accumulated metadata change instructions to the transaction log, composing, for each node of the searchable data structure, a transaction representing the metadata change instructions accumulated in the respective node;
wherein writing the accumulated metadata change instructions to the transaction log includes writing each composed transaction to the transaction log.

6. A method as in claim 5, further comprising:
counting a number of metadata change instructions accumulated in the searchable data structure, and
comparing the counted number of metadata change instructions with a threshold number of metadata change instructions, wherein the accumulated metadata change information is written to the transaction log when the number of metadata change instructions exceeds the threshold number of metadata change instructions; and
removing nodes from the searchable data structure after the accumulated metadata change information in the respective nodes is written to the transaction log.

7. A method as in claim 2,
wherein each of the multiple nodes of the searchable data structure includes multiple bitmaps for tracking metadata change information pertaining to a respective block of the storage medium;
wherein arranging the set of metadata change instructions in the multiple nodes of the searchable data structure includes updating the bitmaps for tracking the metadata change information in different nodes of the searchable data structure.

8. A method as in claim 7,
wherein the multiple bitmaps for each of the multiple nodes of the searchable data structure include i) an allocated bitmap, ii) a to be committed bitmap, iii) a to be modified bitmap, and iv) a to be freed bitmap.

9. A method as in claim 8,
wherein writing the accumulated metadata change information to the transaction log includes:
grouping the bitmaps written into a node of the searchable data structure into a log descriptor entry; and
transferring the log descriptor entry to the transaction log.

10. A method as in claim 1, wherein each of the multiple nodes of the searchable data structure includes a to be committed bitmap for tracking metadata change information pertaining to a respective block of the storage medium.

11. A storage system for preserving metadata changes in a transaction log, the storage system comprising:
a storage device; and
a storage processor, the storage processor including:
memory; and
a set of processors coupled to the memory to form control circuitry, the control circuitry constructed and arranged to:
in response to a request to perform a file system operation on a file stored in the storage device, identify a set of metadata change instructions that accompany the file system operation on the file;

arrange the set of metadata change instructions in multiple nodes of a searchable data structure, each of the multiple nodes accumulating metadata changes specified in metadata change instructions to be recorded in a respective block of storage in the storage device, such that each node of the searchable data structure accumulates metadata change information for a different block of the storage device; and for each node of the set of nodes, write the accumulated metadata change information to the transaction log, wherein each respective block of storage in which metadata change information is to be recorded stores multiple elements of metadata, such that each node of the searchable data structure corresponds to a respective block of storage and to respective metadata elements, wherein, when arranging the metadata change information, the control circuitry accumulating metadata change information to be recorded in a respective block of storage is constructed and arranged to accumulate changes in greater than one of the metadata elements stored in that block of storage, and wherein accumulating the metadata change information in each node of the searchable data structure, the control circuitry is constructed and arranged to accumulate elements of metadata in respective bits of a bitmap, the bitmap providing a respective bit for each of the elements of metadata.

12. A storage system as in claim 11, wherein the storage device stores multiple virtual block map (VBM) blocks, each VBM block including multiple VBM entries, each VBM entry of a VBM block including a VBM pointer pointing to a block location in the storage device;

wherein each of the set of metadata change instructions includes a block identifier identifying a VBM block in the storage device; and wherein the controlling circuitry constructed and arranged to arrange the set of metadata change instructions in multiple nodes of the searchable data structure is further constructed and arranged to read, from each of the set of metadata change instructions, the block identifier identifying the respective VBM block.

13. A storage system as in claim 12, wherein the searchable data structure is a binary tree; and wherein the controlling circuitry constructed and arranged to arrange the set of metadata change instructions in multiple nodes of the searchable data structure is still further constructed and arranged to:

for each of the metadata change instructions, traverse at least a portion of the binary tree to determine whether the block identifier of the VBM block specified in the metadata change instruction is already represented in a node of the binary tree, for each metadata change instruction for which the block identifier is already represented in a node the binary tree, update the respective node of the binary tree to reflect the metadata change instruction, and for each metadata change instruction for which the block identifier is not already represented in a node of the binary tree, generate a new node in the binary tree and updating the new node of the binary tree to reflect the metadata change instruction.

14. A storage system as in claim 13, wherein the binary tree is an Adelson-Velskii and Landis (AVL) tree; and wherein the controlling circuitry is further constructed and arranged to:

after deleting a node of the AVL tree, when leaf nodes of the AVL tree have a difference in height of more than one level, rotate the nodes of the AVL tree so that the leaf nodes have at most one hierarchal level difference in height.

15. A storage system as in claim 12, wherein the controlling circuitry is further constructed and arranged to:

prior to writing the accumulated metadata change instructions to the transaction log, compose, for each node of the searchable data structure, a transaction representing the metadata change instructions accumulated in the respective node;

wherein writing the accumulated metadata change instructions to the transaction log includes writing each composed transaction to the transaction log.

16. A storage system as in claim 15, wherein the controlling circuitry is further constructed and arranged to:

count a number of metadata change instructions accumulated in the searchable data structure, and compare the counted number of metadata change instructions with a threshold number of metadata change instructions, wherein the accumulated metadata change information is written to the transaction log when the number of metadata change instructions exceeds the threshold number of metadata change instructions; and remove nodes from the searchable data structure after the accumulated metadata change information is written to the transaction log.

17. A storage system as in claim 12, wherein each of the multiple nodes of the searchable data structure includes multiple bitmaps for tracking metadata change information pertaining to a respective block of the storage medium;

wherein, when the controlling circuitry is further constructed and arranged to arrange the set of metadata change instructions in multiple nodes of the searchable data structure, the controlling circuitry is still further constructed and arranged to:

update the bitmaps for tracking the metadata change information in different nodes of the searchable data structure.

18. A storage system as in claim 17, wherein the multiple bitmaps for each of the multiple nodes of the searchable data structure include i) an allocated bitmap, ii) a to be committed bitmap, iii) a to be modified bitmap, and iv) a to be freed bitmap.

19. A storage system as in claim 18, wherein the controlling circuitry constructed and arranged to write the accumulated metadata change instructions to the transaction log is further constructed and arranged to:

group the bitmaps written into a node of the searchable data structure into a log descriptor entry; and transfer the log descriptor entry to the transaction log.

20. A computer program product having a non-transitory, computer-readable storage medium which stores instructions which, when executed by a computer, cause the computer to perform a method of preserving metadata changes in a transaction log, the method comprising:

in response to a request to perform a file system operation on a file stored in the storage device, identifying a set of metadata change instructions that accompany the file system operation on the file;

arranging metadata change information specified in the set of metadata change instructions among multiple nodes of a searchable data structure, each of the multiple nodes accumulating metadata change information to be recorded in a respective block of storage in the storage device, such that each node of the searchable data structure accumulates metadata change information for a different block of the storage device; and for each node of the set of nodes, writing the accumulated metadata change information to the transaction log, wherein each respective block of storage in which metadata change information is to be recorded stores multiple elements of metadata, such that each node of the searchable data structure corresponds to a respective block of storage and to respective metadata elements, wherein, when arranging the metadata change information, accumulating metadata change information to be recorded in a respective block of storage includes (i) accumulating changes in greater than one of the metadata elements stored in that block of storage, and (ii) accumulating elements of metadata in respective bits of a bitmap, the bitmap providing a respective bit for each of the elements of metadata.

21. A computer program product as in claim 20, wherein the storage device stores multiple virtual block map (VBM) blocks, each VBM block including multiple VBM entries, each VBM entry including a VBM pointer pointing to a block of the storage device;

wherein each of the set of metadata change instructions includes a block identifier identifying a VBM block in the storage device; and wherein arranging the set of metadata change instructions in multiple nodes of the searchable data structure includes reading, from each of the set of metadata change instructions, the block identifier identifying the respective VBM block.

\* \* \* \* \*